United States Patent
Kurokawa et al.

(10) Patent No.: US 7,871,595 B2
(45) Date of Patent: Jan. 18, 2011

(54) FINE BARIUM TITANATE PARTICLES

(75) Inventors: Haruki Kurokawa, Sanyo Onoda (JP); Koichiro Kanda, Hiroshima (JP); Ryuji Fujita, Sanyo Onoda (JP); Yuji Mishima, Ohtake (JP); Seiji Okazaki, Ohtake (JP); Hidetomo Unemoto, Sanyo Onoda (JP)

(73) Assignee: Toda Kogyo Corporation, Hiroshima-shi (JP)

( * ) Notice: Subject to any disclaimer, the term of this patent is extended or adjusted under 35 U.S.C. 154(b) by 0 days.

(21) Appl. No.: 11/581,061

(22) Filed: Oct. 16, 2006

(65) Prior Publication Data
US 2007/0086941 A1    Apr. 19, 2007

(30) Foreign Application Priority Data
Oct. 19, 2005   (JP) .............................. 2005-305079

(51) Int. Cl.
*C01G 23/00* (2006.01)
*C01F 11/02* (2006.01)

(52) U.S. Cl. .................................. 423/598; 423/594.16

(58) Field of Classification Search ................. 423/598, 423/594.16
See application file for complete search history.

(56) References Cited

U.S. PATENT DOCUMENTS

2004/0185246 A1    9/2004   Ohmori et al.

FOREIGN PATENT DOCUMENTS

WO    WO 2004/092070 A    10/2004

*Primary Examiner*—Stanley Silverman
*Assistant Examiner*—James A Fiorito
(74) *Attorney, Agent, or Firm*—Nixon & Vanderhye P.C.

(57) ABSTRACT

The fine barium titanate particles of the present invention have an average primary particle diameter of from 10 nm to less than 20 nm, a sphericity of 1.00 to 1.18, and a ratio of an average secondary particle diameter to the average primary particle diameter of 0.7 to 6.0. The fine barium titanate particles of the present invention can exhibit a small behavior particle diameter and can be readily monodispersed notwithstanding very fine particles, and as a result, can be suitably used as various dielectric materials because the particles are free from aggregation therebetween and have an excellent dispersibility.

9 Claims, No Drawings

FINE BARIUM TITANATE PARTICLES

BACKGROUND OF THE INVENTION

The present invention relates to fine barium titanate particles, and more particularly, to fine barium titanate particles which are free from aggregation therebetween and exhibit an excellent dispersibility.

With the recent tendency of miniaturization, high-performance and lightening of various electronic equipments, it has been required to improve properties of barium titanate particles used as a dielectric material for electronic parts, for example, laminated ceramic capacitors, etc.

As known in the art, in the conventional laminated capacitors, there have been frequently used barium titanate particles which are in the form of a perovskite compound having a high dielectric constant. The barium titanate particles having a tetragonal system are used as a ferroelectric substance, and have been applied to electronic parts such as ceramic capacitors, positive thermistors and high-frequency oscillators.

The barium titanate particles used for the laminated capacitors have been strongly required to be free from aggregation therebetween and have an excellent dispersibility as well as a high crystallinity.

For example, upon producing a laminated capacitor having a less temperature-dependency, barium titanate used as raw particles therefor must be prevented from undergoing a particle growth thereof. In particular, in order to obtain a high-capacity capacitor, the raw barium titanate particles used therefor are required to exhibit a tetragonal system.

Also, in order to allow the raw particles to exhibit an excellent dispersibility, the barium titanate particles are required to have a spherical particle shape, in particular, it is required that the barium titanate particles have a particle shape as close to a complete sphere as possible.

On the other hand, in recent years, barium titanate has been used as one of materials for forming an inner electrode layer of the laminated ceramic capacitor (Japanese Patent Application Laid-open (KOKAI) No. 2004-200450, etc.).

As the method for producing barium titanate particles, there are conventionally known a solid-phase reaction method of mixing a titanium compound with a barium compound and then calcining the resultant mixture at a temperature as high as not less than 1000° C., and a wet reaction method of reacting barium and titanium with each other in a solution thereof.

However, in the solid-phase reaction method, the resultant calcined barium titanate particles have a large average particle diameter and, therefore, must be pulverized upon use, resulting in broad particle size distribution and poor dispersibility thereof.

In general, in order to obtain barium titanate particles having a tetragonal system, it is required to heat-treat raw particles therefor at a high temperature for crystallization thereof, as described in "BULLETIN OF THE CHEMICAL SOCIETY OF JAPAN", Vol. 47 (5), pp. 1168-1171 (1974) such that "the temperature required for transforming barium titanate from a metastable cubic system into a stable tetragonal system is not lower than about 800° C.".

Meanwhile, there are known the method of producing barium titanate particles by a solid-phase reaction (Japanese Patent Application Laid-Open (KOKAI) No. 2001-316114), the method of producing barium titanate particles by a wet reaction (Japanese Patent Application Laid-Open (KOKAI) Nos. 61-31345 (1986), 7-277710 (1995) and 2002-211926, and WO 00/35811) or the like.

At present, it has been strongly required to provide fine barium titanate particles satisfying the above various requirements. However, such fine barium titanate particles have not been obtained until now.

That is, in Japanese Patent Application Laid-Open (KOKAI) No. 2001-316144, there is described the method of producing barium titanate particles by heat-treating a mixture of barium carbonate and titanium oxide under a low-oxygen partial pressure. However, the resultant barium titanate particles as a high-temperature heat-treated product have a polygonal particle shape and tend to suffer from sintering therebetween, thereby failing to provide barium titanate particles having a high dispersibility.

Also, in Japanese Patent Application Laid-Open (KOKAI) No. 61-31345 (1986), there is described the method of producing barium titanate particles by a hydrothermal reaction. However, in this method, neither crystallinity nor aggregated condition of primary particles of the barium titanate particles is taken into consideration. Therefore, the resultant barium titanate particles may fail to exhibit an excellent dispersibility.

In Japanese Patent Application Laid-Open (KOKAI) No. 7-277710 (1995), there are described the barium titanate particles having a primary particle diameter and a secondary particle diameter which are substantially identical to each other. However, the resultant barium titanate particles are in the form of a cubic system and, therefore, may fail to exhibit a high crystallinity.

In addition, in WO 00/35811, there is described the method of synthesizing fine barium titanate particles by heat-treating an alkaline solution containing a brukite-type titanium oxide and barium. However, the resultant barium titanate particles are in the form of a cubic system and, therefore, may fail to exhibit a high crystallinity.

Further, in Japanese Patent Application Laid-Open (KOKAI) No. 2002-211926, there is described the method of producing tetragonal-system barium titanate particles in which after producing cubic-system barium titanate particles by a hydrothermal reaction, the thus obtained cubic-system barium titanate particles are calcined and transformed into the tetragonal-system barium titanate particles. However, in this method, it is required to conduct the calcination treatment at a high temperature for crystallization thereof, resulting in occurrence of sintering between the particles. Therefore, the obtained barium titanate particles may fail to exhibit an excellent dispersibility.

As a result of the present inventors' earnest study for solving the above problems, it has been found that spherical fine barium titanate particles having a specific average primary particle diameter, a specific ratio between the average primary particle diameter and an average secondary particle diameter, and a specific sphericity, have a small behavior particle diameter, are readily monodispersed and free from aggregation therebetween, and exhibit excellent dispersibility and dielectric characteristics. The present invention has been attained on the basis of this finding.

SUMMARY OF THE INVENTION

An object of the present invention is to provide spherical fine barium titanate particles which are free from aggregation therebetween, can exhibit an excellent dispersibility and excellent dielectric characteristics, and can be produced in an economical and industrially useful manner.

Another object of the present invention is to provide tetragonal system spherical fine barium titanate particles which are free from aggregation therebetween, and can exhibit an excellent dispersibility and excellent dielectric characteristics.

To accomplish the aims, in a first aspect of the present invention, there is provided fine barium titanate particles having an average primary particle diameter of from 10 nm to less than 20 nm, a sphericity of 1.00 to 1.18, and a ratio of an average secondary particle diameter to the average primary particle diameter of 0.7 to 6.0.

In a second aspect of the present invention, there is provided a dispersion comprising fine barium titanate particles having an average primary particle diameter of from 10 nm to less than 20 nm and a sphericity of 1.00 to 1.18, and a dispersion base material in which the fine barium titanate particles are dispersed, wherein a ratio of an average secondary particle diameter of the fine barium titanate particles contained in the dispersion, to the average primary particle diameter, is in the range of 0.7 to 6.0.

DETAILED DESCRIPTION OF THE INVENTION

The present invention will be described in detail below.

The fine barium titanate particles according to the first aspect of the present invention have an average primary particle diameter of from 10 nm to less than 20 nm, a sphericity of 1.00 to 1.18, and a ratio of an average secondary particle diameter to the average primary particle diameter of 0.7 to 6.0.

The average primary particle diameter ($r_1$) of the fine barium titanate particles according to the present invention is from 10 nm to less than 20 nm, preferably 10.5 to 19.5 nm, more preferably 10.5 to 15 nm. At the present time, it may be difficult to industrially produce fine barium titanate particles having an average primary particle diameter of less than 10 nm by the existing production methods. On the other hand, when the average primary particle diameter of the fine barium titanate particles is not less than 20 nm, the resultant particles may fail to exhibit a high dispersibility.

The average secondary particle diameter ($D_{50}$) of the fine barium titanate particles according to the present invention is usually 14 to 100 nm, preferably 19 to 80 nm, more preferably 50 to 65 nm. At the present time, it may be difficult to industrially produce fine barium titanate particles having an average secondary particle diameter ($D_{50}$) of less than 14 nm. When the average secondary particle diameter ($D_{50}$) of the fine barium titanate particles is more than 100 nm, the fine barium titanate particles may fail to exhibit a high dispersibility.

The ratio ($D_{50}/r_1$) of the average secondary particle diameter ($D_{50}$) to the average primary particle diameter ($r_1$) of the fine barium titanate particles according to the present invention is usually 0.7 to 6.0, preferably 1.0 to 5.5, more preferably 1.5 to 5.0, still more preferably 3.5 to 5.0. Since the secondary particles are formed from aggregated primary particles, the lower limit of the ratio ($D_{50}/r_1$) of the average secondary particle diameter ($D_{50}$) to the average primary particle diameter ($r_1$) is theoretically 1.0. However, in the consideration of error and accuracy upon the measurement, the lower limit of the ratio ($D_{50}/r_1$) may become usually about 0.7 When the ratio ($D_{50}/r_1$) of the average secondary particle diameter ($D_{50}$) to the average primary particle diameter ($r_1$) is more than 6.0, it may be difficult to produce fine barium titanate particles having a high dispersibility.

The fine barium titanate particles of the present invention have a sphericity (major axis diameter/minor axis diameter) of 1.00 to 1.18, preferably 1.00 to 1.15, more preferably 1.00 to 1.10. When the sphericity of the fine barium titanate particles is more than 1.18, the resultant fine barium titanate particles may fail to have a spherical shape and tends to be deteriorated in dispersibility.

As to the crystallinity of the fine barium titanate particles according to the present invention, the lattice constant ratio (c/a) of a c-axis length (c) to an a-axis length (a) in a lattice constant thereof is usually 1.0000 to 1.0025, preferably 1.0000 to 1.0022. Meanwhile, when the lattice constant ratio (c/a) becomes closer to 1, the crystal system of the fine barium titanate particles approaches to a cubic system, whereas when the lattice constant ratio (c/a) becomes larger, the crystal system of the fine barium titanate particles approaches to a tetragonal system.

The compositional ratio (Ba/Ti) of barium to titanium contained in the fine barium titanate particles of the present invention is usually 0.97 to 1.01, preferably 0.98 to 1.0, more preferably as close to 1.0 as possible without different phases mixed therein. When the compositional ratio (Ba/Ti) is out of the above-specified range, it may be difficult to obtain fine barium titanate particles having high dielectric characteristics as aimed by the present invention.

The fine barium titanate particles of the present invention have a specific surface area of usually 10 to 110 $m^2/g$, preferably 40 to 105 $m^2/g$, more preferably 75 to 100 $m^2/g$. When the specific surface area of the fine barium titanate particles is less than 10 $m^2/g$, the resultant particles tend to be coarse and suffer from sintering therebetween. As a result, when being mixed with a binder, the fine barium titanate particles tend to be deteriorated in dispersibility in the binder. At the present time, it may be difficult to industrially produce fine barium titanate particles having a specific surface area of more than 110 $m^2/g$.

The dispersion according to the second aspect of the present invention comprises the fine barium titanate particles according to the first aspect of the present invention, which have an average primary particle diameter of from 10 nm to less than 20 nm and a sphericity of 1.00 to 1.18, and a dispersion base material in which the fine barium titanate particles are dispersed, wherein a ratio of an average secondary particle diameter of the fine barium titanate particles contained in the dispersion, to the average primary particle diameter, is in the range of 0.7 to 6.0.

The amount of the fine barium titanate particles contained in the dispersion is usually 0.1 to 50 parts by weight, preferably 0.5 to 40 parts by weight based on 100 parts by weight of the dispersion base material. The dispersion base material is composed of water and/or a water-soluble organic solvent, or an organic solvent, and may also contain, if required, a dispersant, a resin, a defoaming agent, an extender pigment, a drying accelerator, a surfactant, a hardening accelerator, an assistant, etc. The amounts of the dispersant, resin, defoaming agent, extender pigment, drying accelerator, surfactant, hardening accelerator and assistant used in the dispersion base material may be appropriately determined according to applications thereof, and the total amount of these materials added is usually not more than 50% by weight.

Next, the process for producing the fine barium titanate particles according to the present invention is described.

The fine barium titanate particles of the present invention may be produced by the process (1) in which a titanium compound-containing solution is added and mixed in an excess amount of a barium salt solution to react with each other by controlling a pH value of the resultant mixed solution, whereupon the reaction is conducted while suitably adjusting an addition rate of the titanium compound-containing solution. Alternatively, the fine barium titanate particles of the present invention may also be produced by another process (2) in which after a titanium compound-containing solution is added and mixed in an excess amount of a barium salt solution to react with each other by controlling a pH value of the resultant mixed solution, the alkaline suspension containing the thus obtained barium titanate particles is concentrated from more than one time to 10 times (calculated as a concentration of the barium titanate particles therein), and thereafter the thus concentrate suspension is subjected to a hydrothermal treatment at a temperature of 100 to 250° C. and then washed with water to remove excessive residual components therefrom.

The process (1) for producing the fine barium titanate particles according to the present invention is described in detail below. In the production process of adding and mixing the titanium compound-containing solution in an excess amount of the barium salt solution to react with each other by controlling a pH value of the resultant mixed solution, the reaction is conducted while suitably adjusting an addition rate of the titanium compound-containing solution.

The compositional ratio (Ba/Ti) of barium to titanium charged may be usually controlled such that the amount of barium is excessive relative to titanium, and concretely, is preferably 1.0 to 4.0, more preferably 1.0 to 3.0. When the compositional ratio (Ba/Ti) is less than 1.0, the yield of barium titanate core particles produced tends to be lowered. On the other hand, when the compositional ratio (Ba/Ti) is more than 4.0, it may be difficult to remove the excess amount of barium by water-washing. As a result, such a process tends to be uneconomical and unfavorable to the environment unless the barium is recovered and reused.

The pH value of the reaction solution upon producing the barium titanate particles is usually 9 to 14, preferably 12 to 13.5. The reaction temperature is usually 50 to 95° C., preferably 60 to 85° C., and the reaction time is usually 1 to 4 hours, preferably 2 to 3 hours.

The concentration of the reaction solution upon producing the barium titanate particles is usually 0.1 to 0.7 mol/L, preferably 0.3 to 0.6 mol/L (calculated as the titanium compound). When the titanium compound concentration in the reaction solution is less than 0.1 mol/L, such a process tends to be industrially unsuitable because of a too low yield. On the other hand, when the titanium compound concentration in the reaction solution is more than 0.7 mol/L, $Ba(OH)_2$ tends to be precipitated owing to a too low solubility of barium in the barium salt solution, so that it may be difficult to conduct a homogeneous liquid-phase reaction.

During the reaction, it is required to control the reaction system so as not to allow the barium compound to react with carbon dioxide gas in air, etc., by flowing nitrogen therethrough.

In the production process (1), the addition rate of the titanium compound-containing solution upon the reaction is usually 0.1 to 10 L/min, preferably 0.3 to 8 L/min. Meanwhile, the solid content of the titanium compound-containing solution is about 2 to 20% by weight.

When the addition rate of the titanium compound-containing solution is controlled to the above-specified range, it is possible to produce fine barium titanate particles having an average primary particle diameter of from 10 nm to less than 20 nm, a sphericity of 1.00 to 1.18, and a ratio of an average secondary particle diameter to the average primary particle diameter of 0.7 to 6.0.

In the production process (2) for producing the fine barium titanate particles, after a titanium compound-containing solution is added and mixed in an excess amount of a barium salt solution to react with each other by controlling a pH value of the resultant mixed solution similarly to the above production process (1), the alkaline suspension containing the thus obtained barium titanate particles is concentrated from more than one time to 10 times (calculated as a concentration of the barium titanate particles therein), and thereafter the thus concentrated suspension is subjected to a hydrothermal treatment at a temperature of 100 to 250° C. and then washed with water to remove excessive residual components therefrom.

The slurry containing the barium titanate particles is concentrated such that the concentration of the barium titanate particles contained in the slurry is increased to usually from more than one time to 10 times, preferably 2.0 to 5.0 times, more preferably 2.0 to 3.0 times. When the degree of concentration of the slurry is not more than 1.0 time, no sufficient effect of the concentrating treatment tends to be attained. When the degree of concentration of the slurry is more than 10 times, it may be difficult to conduct the concentrating treatment itself as well as the hydrothermal treatment.

The concentration of the reaction solution after the concentrating treatment is usually 0.5 to 1.5 mol/L, preferably 0.6 to 1.4 mol/L (calculated as the barium titanate).

Next, the concentrated reaction solution containing the above barium titanate particles is subjected to a hydrothermal treatment. The temperature used in the hydrothermal treatment is usually 100 to 250° C., preferably 102 to 200° C., more preferably 105 to 120° C. When the hydrothermal treatment temperature is less than 100° C., it may be difficult to obtain dense spherical barium titanate particles. When the hydrothermal treatment temperature is more than 250° C., it may be difficult to design a hydrothermal treatment container suitable for such a hydrothermal treatment. The time required for the hydrothermal treatment is usually 1 to 16 hours and preferably 2 to 10 hours.

The particles obtained after the hydrothermal treatment are washed with water and then dried by ordinary methods. By washing the obtained particles with water, an excess amount of barium can be washed away therefrom, and simultaneously impurities such as Na, K and Cl ions can also be removed therefrom.

As the barium salt solution used in the present invention, there may be used aqueous solutions of barium hydroxide, barium chloride, barium nitride, etc. Meanwhile, an aqueous solution of a barium salt other than barium hydroxide is preferably used in the form of a basic aqueous solution by adding an aqueous alkaline solution thereto.

The titanium compound-containing solution used in the present invention is in the form of a titanate-containing solution obtained by neutralizing an aqueous titanium salt solution with an aqueous alkaline solution or hydrolyzing the aqueous titanium salt solution. Also, the titanium compound-containing solution may be obtained by heat-treating the titanate-containing solution to deaggregate titanium oxide in a solvent. Examples of the aqueous titanium salt solution may include aqueous solutions of titanium tetrachloride, titanyl sulfate, titanium alkoxide, etc.

Examples of the aqueous alkaline solution used in the present invention may include an aqueous sodium hydroxide solution, an aqueous potassium hydroxide solution, an aqueous barium hydroxide solution, an aqueous ammonia solution, etc.

The amount of the aqueous alkaline solution added is usually 0.1 to 10 mol, preferably 0.5 to 4 mol per one mol of titanium.

In the process for producing the fine barium titanate particles according to the present invention, in order to produce tetragonal-system spherical fine barium titanate particles, there is preferably used combination of the above production processes (1) and (2). More specifically, the production process comprises a step (a) of adding and mixing the titanium compound-containing solution in an excess amount of the barium salt solution to react with each other by controlling a pH value of the resultant mixed solution while suitably adjusting an addition rate of the titanium compound-containing solution; a step (b) of concentrating the alkaline suspension containing the thus obtained barium titanate particles from more than one time to 10 times (calculated as a concentration of the barium titanate particles contained in the suspension); a step (c) of subjecting the resultant concentrated suspension to a hydrothermal treatment at a temperature of 100 to 250° C.; and a step (d) of washing the thus obtained barium titanate particles with water to remove excessive residual components therefrom.

Meanwhile, the thus obtained barium titanate particles may be subjected to pulverization and deaggregation treatments.

Further, as the production process of the dispersion according to the present invention, there is exemplified a process in which the suspension obtained after the water-washing in the above production process may be directly used as the dispersion of the present invention, or a process in which the dispersion may also be produced by dispersing the fine barium titanate particles obtained after the water-washing and drying, in a dispersion base material by an ordinary method.

A point of the present invention is that the fine barium titanate particles are very fine, i.e., the average primary particle diameter thereof is in the range of from 10 nm to less than 20 nm, and the fine barium titanate particles also have a spherical particle shape and a specific ratio between a primary particle diameter and a secondary particle diameter.

The fine barium titanate particles of the present invention have a specific ratio of the secondary particle diameter to the primary particle diameter and, therefore, can be prevented from suffering from aggregation therebetween notwithstanding fine particles, and can be readily monodispersed. Therefore, the fine barium titanate particles of the present invention can exhibit an excellent dispersibility owing to a spherical shape of primary particles thereof as well as substantially no presence of aggregated particles therein.

Also, the fine barium titanate particles of the present invention have a spherical particle shape and are excellent in dispersibility and, therefore, can be prevented from suffering from sintering therebetween even when subjected to heat treatment.

The fine barium titanate particles of the present invention are very fine particles and have a small behavior particle diameter and, therefore, can be readily monodispersed.

Further, when using the fine barium titanate particles of the present invention as a starting material, it is possible to produce barium titanate particles having a high crystallinity notwithstanding fine particles.

EXAMPLES

The present invention will be described in more detail hereinunder by Examples and Comparative Examples, but the Examples are only illustrative and, therefore, not intended to limit the scope of the present invention.

Various properties were measured by the following methods. Meanwhile, the "primary particles" used herein means minimum particles which can be observed as individual particles by an electron microscope, etc., whereas the "secondary particles" used herein means minimum particles which are formed by aggregation or fusion of a plurality of the primary particles and can be observed as behavior particles in a solvent.

(1) The average primary particle diameter ($r_1$) of the particles was expressed by an average of particle diameters of about 200 particles measured on a micrograph (magnification:×50,000) observed by a scanning electron microscope "S-4300" manufactured by Hitachi Limited. The sphericity of the particles was expressed by the ratio of a major axis diameter to a minor axis diameter of the particles which were measured from the above micrograph.

(2) The crystal structure of the particles was determined as follows. That is, the diffraction peak was measured in a region (2θ) of 10 to 86° using an X-ray diffraction apparatus "RADIIA" (Bulb used: Cu; manufactured by RIGAKU DENKI KOGYO CO., LTD.) and the lattice constant ratio (c/a) was calculated from the measured values by Rietveld analysis method.

(3) The average secondary particle diameter ($D_{50}$) of the particles was determined as follows. That is, 100 mg of barium titanate particles were dispersed in a sodium hexametaphosphate aqueous solution (concentration: 0.2% by weight). The volume-based particle size distribution of the particles dispersed in the obtained dispersion was measured by a dynamic light scattering method using a measuring apparatus "NIKKISO MICROTRAC UPA150" (manufactured by Nikkiso Co., Ltd.), or by a laser diffraction scattering method using a measuring apparatus "NIKKISO MICROTRAC HRA, MODEL9320-X100" (manufactured by Nikkiso Co., Ltd.) and the average secondary particle diameter ($D_{50}$) of the particles was determined therefrom. Here, "$D_{50}$" means such a particle diameter at which a cumulative volume ratio of the particles accumulated relative to the particle diameter thereof reaches 50% on the basis of a whole volume of the particles as 100%.

(4) The composition ratio (Ba/Ti) was measured using a fluorescent X-ray analyzer "Simultix 12" (manufactured by RIGAKU DENKI CO., LTD.).

(5) The specific surface area value was measured by BET method.

Example 1

<Production of Barium Titanate Particles>

1.12 kg of barium hydroxide octahydrate (produced by KANTO KAGAKU CO., LTD.; 97% $Ba(OH)_2.8H_2O$ guaranteed reagent) was dissolved in water and purified. The resultant solution was dropped in 688 g of a titanium chloride aqueous solution and neutralized, thereby obtaining a titanium hydroxide colloid. Separately, a solution obtained by dissolving and purifying 1.28 kg of barium hydroxide octahydrate in water was held in a reaction vessel at a temperature of 70° C. and a pH value of 12.5 under a nitrogen atmosphere. Next, the previously prepared titanium hydroxide colloid was charged into the thus prepared barium hydroxide aqueous solution for 2 minutes at an addition rate of 1 L/min. The obtained mixed solution was reacted at 70° C. for 2 hours to produce barium titanate. The obtained reaction solution was cooled to room temperature, and then washed with water using a Nutsche until no Ba ions were recognized in a filtrate thereof. Thereafter, the obtained solid was filtered out and dried, thereby obtaining fine barium titanate particles.

It was confirmed that the obtained fine barium titanate particles were spherical particles having an average primary particle diameter ($r_1$) of 14 nm and a sphericity of 1.09, and exhibited a molar ratio of Ba to Ti (Ba/Ti) of 0.990 and a lattice constant ratio (c/a) of 1.0000. Further, it was confirmed that the average secondary particle diameter ($D_{50}$) of the obtained barium titanate particles was 60 nm, and the ratio ($D_{50}/r_1$) of the average secondary particle diameter ($D_{50}$) to the average primary particle diameter ($r_1$) was 4.26.

Examples 2, 3, 5 and 6, Comparative Examples 1 and 2:

The same procedure as defined in Example 1 was conducted except that kind and amount added of the titanium salt compound, kind and amount added of the barium salt solution, addition rate of the titanium salt compound, and reaction temperature and time were changed variously, thereby obtaining barium titanate particles.

Production conditions are shown in Table 1, and various properties of the obtained barium titanate particles are shown in Table 2.

Example 4

The alkaline suspension containing the barium titanate particles obtained in Example 3 was concentrated such that the concentration of the barium titanate particles in the suspension reached 2.2 times. Next, the thus obtained concentrated suspension (reaction concentration: 1.1 mol/L) was charged into an autoclave and subjected to a hydrothermal treatment at 105° C. for 2 hours. After cooling to room temperature, the obtained reaction solution was washed with water using a Nutsche until no Ba ions were recognized in a filtrate thereof. Thereafter, the obtained solid was filtered out and dried, thereby obtaining tetragonal-system fine barium titanate particles.

It was confirmed that the obtained tetragonal-system fine barium titanate particles were spherical particles having an average primary particle diameter ($r_1$) of 14 nm and a sphericity of 1.06, and exhibited a molar ratio of Ba to Ti (Ba/Ti) of 0.993 and a lattice constant ratio (c/a) of 1.0021. Further, it was confirmed that the average secondary particle diameter ($D_{50}$) of the tetragonal-system fine barium titanate particles was 55 nm, and the ratio ($D_{50}/r_1$) of the average secondary particle diameter ($D_{50}$) to the average primary particle diameter ($r_1$) was 3.93.

Examples 7 and 8

The same procedure as defined in Example 1 was conducted except that addition rate of the titanium compound-containing solution, pH of the mixed solution, and reaction temperature and time, were changed variously, thereby obtaining an alkaline suspension containing barium titanate particles. Next, the same procedure as defined in Example 4 was conducted except that concentration of barium titanate particles in the thus obtained and then concentrated alkaline suspension containing barium titanate particles (degree of precipitation concentration: times), reaction concentration, and hydrothermal treatment temperature and time were changed variously, thereby obtaining tetragonal-system fine barium titanate particles. Production conditions are shown in Table 1, and various properties of the obtained barium titanate particles are shown in Table 2.

Comparative Example 3

The same procedure as defined in Example 4 was conducted except that the alkaline suspension containing the barium titanate particles obtained in Comparative Example 1 was used as the alkaline suspension containing the raw barium titanate particles, and the degree of concentration thereof, and the reaction temperature and time were respectively changed, thereby obtaining barium titanate particles. Production conditions are shown in Table 1, and various properties of the obtained barium titanate particles are shown in Table 2.

TABLE 1

| | Production of cubic-system barium titanate particles | | | |
|---|---|---|---|---|
| Examples and Comparative Examples | Reaction concentration (mol/L) | Ratio of Ba/Ti charged (molar ratio) | Kind of raw Ba material | Kind of raw Ti material |
| Example 1 | 0.48 | 3.00 | $Ba(OH)_2 \cdot 8H_2O$ | $TiCl_{2.85}OH_{1.15}$ |
| Example 2 | 0.48 | 3.00 | $Ba(OH)_2 \cdot 8H_2O$ | $TiCl_{2.85}OH_{1.15}$ |
| Example 3 | 0.48 | 3.00 | $Ba(OH)_2 \cdot 8H_2O$ | $TiCl_{2.85}OH_{1.15}$ |
| Example 4 | 0.48 | 3.00 | $Ba(OH)_2 \cdot 8H_2O$ | $TiCl_{2.85}OH_{1.15}$ |
| Example 5 | 0.48 | 3.00 | $Ba(OH)_2 \cdot 8H_2O$ | $TiCl_{2.85}OH_{1.15}$ |
| Example 6 | 0.48 | 3.00 | $Ba(OH)_2 \cdot 8H_2O$ | $TiCl_{2.85}OH_{1.15}$ |
| Example 7 | 0.48 | 3.00 | $Ba(OH)_2 \cdot 8H_2O$ | $TiCl_{2.85}OH_{1.15}$ |
| Example 8 | 0.48 | 3.00 | $Ba(OH)_2 \cdot 8H_2O$ | $TiCl_{2.85}OH_{1.15}$ |
| Comparative Example 1 | 0.40 | 3.00 | $Ba(OH)_2 \cdot 8H_2O$ | $TiCl_{2.85}OH_{1.15}$ |
| Comparative Example 2 | 0.50 | 1.56 | $Ba(OH)_2 \cdot 8H_2O$ | $TiO_2 \cdot H_2O$ |
| Comparative Example 3 | 0.40 | 3.00 | $Ba(OH)_2 \cdot 8H_2O$ | $TiCl_{2.85}OH_{1.15}$ |

| | Production of cubic-system barium titanate particles Reaction conditions | | | |
|---|---|---|---|---|
| Examples and Comparative Examples | Addition rate (L/min) | pH | Temperature (° C.) | Time (hr) |
| Example 1 | 1.0 | 12.5 | 70 | 2 |
| Example 2 | 2.0 | 12.6 | 70 | 2 |
| Example 3 | 2.0 | 12.5 | 70 | 1 |
| Example 4 | 2.0 | 12.6 | 70 | 1 |
| Example 5 | 0.5 | 12.5 | 70 | 2 |
| Example 6 | 4.0 | 12.7 | 70 | 1 |
| Example 7 | 3.0 | 12.6 | 70 | 1 |
| Example 8 | 2.5 | 12.6 | 70 | 1 |
| Comparative Example 1 | 0.4 | 12.3 | 70 | 4 |
| Comparative Example 2 | 0.4 | 12.1 | 75 | 3 |
| Comparative Example 3 | 0.4 | 12.4 | 70 | 4 |

| | Hydrothermal treatment | | | |
|---|---|---|---|---|
| Examples and Comparative Examples | Concentration Degree of precipitation concentration (times) | Reaction concentration (mol/L) | Hydrothermal treatment temperature (° C.) | Hydrothermal treatment time (hr) |
| Example 1 | — | — | — | — |
| Example 2 | — | — | — | — |
| Example 3 | — | — | — | — |
| Example 4 | 2.2 | 1.1 | 105 | 2 |
| Example 5 | — | — | — | — |
| Example 6 | — | — | — | — |
| Example 7 | 2.0 | 1.0 | 110 | 4 |
| Example 8 | 2.9 | 1.4 | 105 | 3 |
| Comparative Example 1 | — | — | — | — |
| Comparative Example 2 | — | — | — | — |
| Comparative Example 3 | 2.0 | 0.8 | 150 | 8 |

TABLE 2

| Examples and Comparative Examples | Properties of barium titanate particles | | | |
|---|---|---|---|---|
| | BET ($m^2/g$) | Average primary particle diameter ($r_1$) (nm) | Sphericity (—) | Ba/Ti ratio (molar ratio) |
| Example 1 | 80.4 | 14 | 1.09 | 0.990 |
| Example 2 | 85.2 | 13 | 1.08 | 0.990 |
| Example 3* | 95.3 | 11 | 1.04 | 0.987 |
| Example 4 | 80.1 | 14 | 1.06 | 0.993 |
| Example 5 | 45.3 | 19 | 1.09 | 0.997 |
| Example 6 | 105.2 | 10 | 1.03 | 0.991 |
| Example 7 | 61.8 | 17 | 1.08 | 0.996 |
| Example 8 | 70.4 | 16 | 1.05 | 0.998 |
| Comparative Example 1** | 47.5 | 23 | 1.10 | 0.994 |
| Comparative Example 2 | 49.4 | 21 | 1.04 | 0.990 |
| Comparative Example 3 | 23.7 | 47 | 1.09 | 0.993 |

| Examples and Comparative Examples | Properties of barium titanate particles | | |
|---|---|---|---|
| | Lattice constant ratio (c/a) (—) | Average secondary particle diameter ($D_{50}$) (nm) | $D_{50}/r_1$ (ratio of secondary particle diameter to primary particle diameter) |
| Example 1 | 1.0000 | 60 | 4.26 |
| Example 2 | 1.0000 | 62 | 4.77 |
| Example 3 | 1.0000 | 54 | 4.91 |
| Example 4 | 1.0021 | 55 | 3.93 |
| Example 5 | 1.0025 | 95 | 4.98 |
| Example 6 | 1.0000 | 33 | 3.25 |
| Example 7 | 1.0015 | 69 | 4.05 |
| Example 8 | 1.0013 | 67 | 4.18 |
| Comparative Example 1 | 1.0000 | 130 | 5.64 |
| Comparative Example 2 | 1.0000 | 756 | 35.98 |
| Comparative Example 3 | 1.0033 | 82 | 1.74 |

Note:
*The barium titanate particles of Example 3 correspond to those of Example 4 before being subjected to hydrothermal treatment.
**The barium titanate particles of Comparative Example 1 correspond to those of Comparative Example 3 before being subjected to hydrothermal treatment.

As shown in Table 2, it was confirmed that the average primary and secondary particle diameters of the barium titanate particles obtained according to the present invention were respectively fallen within the specific ranges. Further, it was confirmed that the barium titanate particles obtained according to the present invention were free from aggregation therebetween and exhibited an excellent dispersibility.

What is claimed is:

1. Tetragonal system fine barium titanate particles having an average primary particle diameter of from 10 nm to less than 20 nm, a sphericity of 1.00 to 1.18, a ratio of an average secondary particle diameter to the average primary particle diameter of 0.7 to 6.0, and a lattice constant ratio (c/a) of a c-axis length (c) to an a-axis length (a) in a lattice constant of the fine barium titanate particles is in the range of 1.0013 to 1.0025.

2. Fine barium titanate particles according to claim 1, wherein the average primary particle diameter of the fine barium titanate particles is in the range of 10.5 to 19.5 nm.

3. Fine barium titanate particles according to claim 1, wherein the sphericity of the fine barium titanate particles is in the range of 1.00 to 1.15.

4. Fine barium titanate particles according to claim 1, wherein the ratio of the average secondary particle diameter to the average primary particle diameter is in the range of 1.0 to 5.5.

5. Fine barium titanate particles according to claim 1, wherein the average secondary particle diameter of the fine barium titanate particles is in the range of 14 to 100 nm.

6. Fine barium titanate particles according to claim 1, wherein a lattice constant ratio (c/a) of a c-axis length (c) to an a-axis length (a) in a lattice constant of the fine barium titanate particles is in the range of 1.0013 to 1.0025.

7. Fine barium titanate particles according to claim 1, wherein a compositional ratio (Ba/Ti) of barium to titanium in the fine barium titanate particles is in the range of 0.97 to 1.01.

8. Fine barium titanate particles according to claim 1, wherein the fine barium titanate particles have a specific surface area of 10 to 110 m.sup.2/g.

9. A dispersion comprising the fine barium titanate particles as defined in claim 1, and a dispersion base material in which the fine barium titanate particles are dispersed.

* * * * *